Patented Apr. 24, 1945

2,374,603

UNITED STATES PATENT OFFICE 2,374,603

COATING MATERIAL

Stanislav M. Kolar, Chicago, and Alexander G. Sternberg, Glen Ellyn, Ill., assignors to Allied Finishing Specialties Co., Chicago, Ill., a corporation of Illinois No Drawing. Application May 15, 1941, Serial No. 393,670

11 Claims. (Cl. 106—180)

The present invention relates generally to coating materials. More particularly the invention relates to that type of material which includes a film forming substance together with one or more solvents and serves, after hardening thereof, i. e., dissipation or evaporation of the solvents, either as an undercoat or as a finish or topcoat.

The primary object of the invention is to provide a coating material of this type which, due to the ingredients or component parts thereof, is especially designed for use on various forms or types of plastics including cellulose acetate; cellulose acetate modifications, such as propinate aceto-butyrate; styrenes; modifications of styrenes; vinyls; poly-vinyls; poly-vinyl styrenes; vinyl chlorides; vinyl acetate co-polymer-poly vinyl chloride; poly-vinyl acetate; methyl-methacrylate; and methacrylates.

Another object of the invention is to provide a coating material of the last mentioned character which may be produced at a comparatively low cost, sets in a comparatively short time and is not only durable but also may be applied either by a brush or by a dipping or spraying operation.

Other objects of the invention and the various advantages and characteristics of the present coating material will be apparent from a consideration of the following detailed description.

The invention consists in the coating material which is hereinafter set forth and more particularly defined by the claims at the conclusion hereof.

The coating material which forms the subject matter of the invention is primarily designed for use on substantially all plastics. It is capable of being applied either by a brush or by a dipping or spraying operation and when in a hardened state is in the form of a film which is in adhering or substantially permanently bonded relation with the plastic surface to which it is applied. In addition it may be used either as an undercoat for a topcoat of other finish material (paint or lacquer) or as a topcoat itself. As its principal or main constituents or component parts the coating material comprises: a film forming substance in the form of a cellulosic derivative; a solvent medium for the film forming substance; a plasticizing agent for the film forming substance; a solvent material for softening the surface of the plastic to which the coating material is applied; an agent for bonding the film forming substance to the softened plastic surface; and an agent for promoting compatibility of the other ingredients or constituents of the material.

Film forming substance

Nitro cellulose is preferably used as the film forming substance of the material and serves to form, after drying or hardening of the material, a hard glossy film. So far as the present material is concerned the viscosity of the nitrocellulose component is immaterial. Preferably nitrocellulose of standard or conventional viscosity is employed. Instead of nitrocellulose either ethyl cellulose or cellulose acetate may be used as the film forming substance of the material. If ethyl cellulose is used the resultant film is relatively soft and pliable and in this sense it differs from a nitrocellulose film. Ethyl cellulose is preferably used as the film forming substance when it is desired to bend or reshape the plastic after application of the coating material to the plastic. Ethyl cellulose of various viscosities may be used. For best results however ethyl cellulose having an ethoxyl value of from 40 to 55 should be employed. If cellulose acetate is employed as the film forming substance it forms, after drying or hardening of the material, a soft tough film.

If it is desired to change the texture or structure of the film which remains on the plastic after hardening of the coating material it is contemplated that the film forming substance, regardless of which of the three aforementioned cellulosic derivatives is used, be fortified with urea-formaldehydes; melamines; alkyds; synthetic resins, such as glyptols, amberols, coumarones, and ester gum; or natural gum, such as manila, damar, kauri, and pontianac. The urea-formaldehydes are used for fortification of the film forming substance when it is desired to increase the toughness of the film and reduce brittleness. Melamines are employed as the fortification medium when it is desired to increase the elasticity of the film. Various forms or types of alkyds are used to fortify the main or basic film forming substance when it is desired to make the film resistant to certain chemicals. Synthetic resins or natural gums are employed as the fortification medium when cost is a factor and it is desired only to increase the toughness of the film. Fortification of the cellulosic derivative constituting the film forming substance of the coating material is optional. If it is desired to have a colored film remain on the plastic surface after hardening of the material any suitable color pigment or dye is introduced into the material during mixing of the latter. If a fortifying medium is employed for the film forming substance and it is desired to have a colored film the color pigment or dye is preferably ground or dispersed in the fortifying medium.

*Solvent medium for film forming substance*

As a solvent medium for the film forming substance a mixture of mesityl-oxide and butyl acetate is preferably employed. Mesityl-oxide is employed because it is one of the better solvents for any one of the three aforementioned cellulosic derivatives and it is mixed with the butyl acetate with a view of reducing the cost and because it acts more quickly when mixed with the second mentioned solvent. Instead of using butyl acetate with the mesityl-oxide to form the solvent medium for the film forming substance any one of the following other solvents may be used or employed: amyl acetate, ethyl acetate, acetone, butyl alcohol, methyl alcohol, ethyl alcohol, diacetone alcohol, diacetone, octyl acetate, octyl alcohol, isopropyl acetate and isophorone. The last mentioned solvents are relatively inexpensive and when any is mixed with mesityl-oxide it promotes or accelerates the solvent action of the latter.

*Plasticizing agent for film forming substance*

As a medium for plasticizing the film forming substance, regardless of whether the latter is nitrocellulose, ethyl cellulose or cellulose acetate, triphenyl-phosphate is employed. Such material not only serves as an efficient and effective plasticizing medium for the film forming substance but also augments the bonding properties of the agent for bonding the film forming substance to the softened plastic surface. In lieu of triphenyl-phosphate any one of the following materials may be employed as the plasticizing agent for the film forming substance—dibutyl phthalate, diethyl phthalate, dimethyl phthalate, diphenyl phthalate, tricresyl phosphate, linseed oil, mineral oil, castor oil, pine oil and tung oil. A plasticizing material like triphenyl phosphate is employed because it serves not only as a plasticizing agent for the film forming substance but also because it prevents destruction of the film by heat. In other words, the triphenyl phosphate component of the material serves to make heat resistant the film resulting after drying of the material.

*Solvent material for softening plastic surface*

As the solvent material for softening the surface of the plastic to which the coating material is applied a mixture of nitroparaffins and toluol is preferably employed. It is well known that nitroparaffins constitute an effective and efficient solvent for the various plastic materials heretofore mentioned. Of the various nitroparaffins those known commercially as 1-nitropropane and 2-nitropropane are employed. Such nitropropanes act quickly to soften the plastic surface to which the material is applied and are used in combination with toluol for the reason that the latter operates or acts as a latent solvent and prevents the nitroparaffins (1-nitropropane and 2-nitropropane) from penetrating too far into the plastic surface. As a substitute for toluol it is feasible or practical to employ other forms or types of coal tar diluents, such as xylol. Instead of toluol or other forms or types of coal tar diluents a mineral diluent such as naphtha may be used.

*Agent for bonding the film forming substance to the softened plastic surface*

As the agent for bonding the film forming substance to the plastic surface which is softened by the solvent material consisting of a mixture of nitroparaffins and toluol, methyl phthalyl ethyl glycollate is preferably employed. This material when combined with any of the aforementioned plasticizing agents for the film forming substance serves effectively and efficiently to bond the film forming substance to the softened plastic. Instead of methyl phthalyl ethyl glycollate any one of the following bonding agents may be used—ortho-toluene, para-toluene, ethyl sulfonamides, ortho-cresyl-para-toluene sulphonate, butyl phthalyl butyl glycollate, and ethyl phthalate ethyl glycollate.

*Compatibility promoting agent*

For promoting compatibility of the various ingredients it is preferred to use or employ a mixture of 1 part dioxane and 4 parts diethylene dioxide (dioxane). This ingredient or any like material having like properties or characteristics serves in particular to make the bonding agent (methyl phthalyl ethyl glycollate) compatible with the triphenyl phosphate.

*Example of coating material*

An example of a reliable or practical formula is as follows:

| Ingredients | Weight |
|---|---|
| | *Percent* |
| Nitro-cellulose | 24 |
| Mesityl-oxide | 6 |
| Butyl acetate | 12 |
| Triphenyl-phosphate | 1 |
| 1-nitropropane | 12 |
| 2-nitropropane | 6 |
| Toluol | 24 |
| Methyl-phthalyl-ethyl-glycollate | 3 |
| A mixture of 1 part dioxene and 4 parts diethylene dioxide | 12 |

So far as the foregoing formula is concerned the various proportions or amounts of the ingredients are not critical. As an illustration the amounts of the ingredients may be varied as follows:

|  | Per cent |
|---|---|
| Nitro-cellulose | 5 to 35 |
| Mesityl oxide and butyl acetate | 6 to 20 |
| Triphenyl-phosphate | ¼ of 1 to 4 |
| 1-nitropropane and 2-nitropropane | 6 to 24 |
| Toluol | 5 to 60 |
| Methyl-phthalyl-ethyl-glycollate | 1 to 5 |
| A mixture of 1 part dioxane and 4 parts diethylene dioxide | 10 to 15 |

The coating material is made by first mixing together the various solvents and then adding the other ingredients.

The material may be used as an undercoat or a topcoat as heretofore indicated. It may be used or employed with advantage when it is desired to produce on a plastic a decorative effect which cannot be formed on the plastic itself. Further, it may be employed with advantage as a medium for decorating a single colored plastic or to make a one colored plastic material of low cost simulate a more expensive plastic material.

In addition, the material has special advantage in providing a finish which will make the plastic material to which it is applied impervious to solvents and other solutions and chemicals which are likely to attack the plastic.

The herein described material when made in accordance with the aforementioned formula is dust free in 2 to 5 minutes, tack free within 10 minutes, print free from ½ hour to 2 hours, and dry for shipping purposes within 12 hours. It is capable of being produced at a comparatively low and reasonable cost and is useable as an undercoat or a topcoat for substantially all known types or forms of plastics.

The invention is not to be understood as restricted to the specific ingredients and proportions set forth since these may be modified or changed within the scope of the appended claims without departing from the spirit and scope of the invention.

Having thus described the invention what we claim as new and desire to secure by Letters Patent is:

1. A coating material for plastics of the type specified, comprising nitrocellulose as a film forming substance, a solvent medium for the nitrocellulose including mesityl oxide and an additional solvent selected from the group composed of butyl acetate, amyl acetate, ethyl acetate, acetone, butyl alcohol, methyl alcohol, ethyl alcohol, diacetone alcohol, diacetone, octyl acetate, octyl alcohol, isopropyl acetate and isophorone, a solvent for softening the surface of the plastic to which the material is applied composed of nitro paraffin and toluol, and an agent for bonding the film forming substance to the softened plastic surface, selected from the group composed of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate.

2. A homogeneous coating material for plastics of the type specified, comprising a film forming substance in the form of a cellulosic derivative selected from the group composed of an ether of cellulose and an ester of cellulose, a solvent medium for the film forming substance, a solvent material for softening the surface of the plastic to which the material is applied in the form of nitroparaffin and toluol, and an agent for bonding the film forming substance to the softened plastic surface selected from the group consisting of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate.

3. A homogeneous coating material for plastics of the type specified, comprising a film forming substance in the form of a cellulosic derivative selected from the group composed of an ether of cellulose and an ester of cellulose, a solvent medium for the film forming substance, a plasticizing agent for the film forming substance selected from the group composed of triphenyl phosphate, dibutyl phthalate, diethyl phthalate, dimethyl phthalate, diphenyl phthalate, tricresyl phosphate, linseed oil, mineral oil, castor oil, pine oil and tung oil, a solvent material for softening the surface of the plastic to which the material is applied in the form of 1-nitropropane, 2-nitropropane, and toluol, and an agent for bonding the film forming substance to the softened plastic surface selected from the group consisting of glycollate, ortho-toluene, para-toluene, ethyl sulfonamides, ortho-cresyl-para-toluene sulphonate, butyl phthalyl butyl glycollate, and ethyl phthalate ethyl glycollate.

4. A homogeneous coating material for plastics of the type specified, comprising nitrocellulose as a film forming substance, a solvent medium for the film forming substance including mesityl oxide, a plasticizing agent for said film forming substance selected from the group consisting of triphenyl phosphate, dibutyl phthalate, diethyl phthalate, dimethyl phthalate, diphenyl phthalate, tricresyl phosphate, linseed oil, mineral oil, castor oil, pine oil and tung oil, a solvent material for softening the surface of the plastic to which the coating material is applied in the form of nitroparaffin and toluol, and an agent for bonding the film forming substance to the softened plastic surface in the form of methyl phthalyl ethyl glycollate.

5. A coating material for plastics of the type specified, comprising nitrocellulose as a film forming substance, a solvent medium for the film forming substance including mesityl oxide, a plasticizing agent for the film forming substance selected from the group consisting of triphenyl phosphate, dibutyl phthalate, diethyl phthalate, dimethyl phthalate, diphenyl phthalate, tricresyl phosphate, linseed oil, mineral oil, castor oil, pine oil and tung oil, a material for softening the surface of the plastic to which the coating material is applied including nitroparaffin, and an agent for bonding the film forming substance to the softened plastic surface selected from the group composed of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate.

6. A coating material for plastics of the type specified, comprising a film forming substance in the form of a cellulosic derivative selected from the group composed of an ether of cellulose and an ester of cellulose, a solvent medium for the film forming substance including mesityl oxide, a plasticizing agent for the film forming substance selected from the group composed of triphenyl phosphate, dibutyl phthalate, diethyl phthalate, dimethyl phthalate, diphenyl phthalate, tricresyl phosphate, linseed oil, mineral oil, castor oil, pine oil and tung oil, a solvent material for softening the surface of the plastic to which the coating material is applied including nitroparaffin, and an agent for bonding the film forming substance to the softened plastic surface selected from the group composed of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate.

7. A homogeneous coating material for plastics of the type specified, comprising nitrocellulose as a film forming substance, a solvent medium for the film forming substance composed of mesityl oxide and an additional solvent selected from the group composed of butyl acetate, amyl acetate, ethyl acetate, acetone, butyl alcohol, methyl alcohol, ethyl alcohol, diacetone alcohol, diacetone, octyl acetate, octyl alcohol, isopropyl acetate and isophorone, a plasticizing agent for the nitrocellulose selected from the group composed of triphenyl phosphate, dibutyl phthalate, diethyl phthalate, dimethyl phthalate, diphenyl phthalate, tricresyl phosphate, linseed oil, mineral oil, castor oil, pine oil, and tung oil, a solvent material for softening the surface of the plastic to which the coating material is applied in the form of 1-nitropropane, 2-nitropropane and toluol, and an agent for bonding the film forming substance to the softened plastic surface selected from the group composed of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate.

8. A homogeneous coating material for plastics of the type specified, comprising a film forming substance in the form of a cellulosic derivative selected from the group composed of nitrocellulose, ethyl cellulose and cellulose acetate, a solvent medium for the film forming substance, a plasticizing agent for said film forming substance selected from the group composed of triphenyl phosphate, dibutyl phthalate, diethyl phthalate, dimethyl phthalate, diphenyl phthalate, tricresyl phosphate, linseed oil, mineral oil, castor oil, pine oil and tung oil, a solvent material for softening the surface of the plastic to which the coating material is applied in the form of nitro paraffin and toluol, an agent for bonding the film forming substance to the softened plastic surface selected from the group consisting of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate, and a compatibility promoting agent in the form of a mixture of 1 part dioxene and 4 parts diethylene dioxide.

9. A homogeneous coating material for plastics of the type specified, comprising nitrocellulose as a film forming substance, a solvent medium for the film forming substance including mesityl oxide, a plasticizing agent for said film forming substance selected from the group consisting of triphenyl phosphate, dibutyl phthalate, diethyl phthalate, dimethyl phthalate, diphenyl phthalate, tricresyl phosphate, linseed oil, mineral oil, castor, pine oil and tung oil, a solvent material for softening the surface of the plastic to which the coating material is applied in the form of 1-nitropropane, 2-nitropropane, and toluol, an agent for bonding the film forming substance to the softened plastic surface selected from the group consisting of methyl phthalyl ethyl glycollate, ortho-toluene, para-toluene, ethyl sulfonamides, ortho-cresyl-para-toluene sulphonate, butyl phthalyl butyl glycollate, and ethyl phthalate ethyl glycollate, and a compatibility promoting agent in the form of a mixture of 1 part dioxene and 4 parts diethylene dioxide.

10. A coating material of the type described, comprising the following ingredients in substantially the amounts specified: nitrocellulose 5% to 35% by weight, mesityl oxide and butyl acetate 6% to 20% by weight, triphenyl phosphate ¼% to 4% by weight, 1-nitropropane and 2-nitropropane 6% to 24% by weight, toluol 5% to 60% by weight, methyl-phthalyl-ethyl-glycollate 1% to 5% by weight, and a mixture of 1 part dioxene and 4 parts diethylene dioxide 10% to 15% by weight.

11. A coating material comprising the following ingredients in substantially the proportions specified: nitrocellulose 24% by weight, mesityl oxide 6% by weight, butyl acetate 12% by weight, triphenyl-phosphate 1% by weight, 1-nitropropane 12% by weight, 2-nitropropane 6% by weight, toluol 24% by weight, methyl-phthalyl-ethyl-glycollate 3% by weight, and a mixture of 1 part dioxene and 4 parts diethylene dioxide 12% by weight.

STANISLAV M. KOLAR.
ALEXANDER G. STERNBERG.